March 24, 1936.  E. P. BULLARD, JR., ET AL  2,035,043
CYLINDRICAL SURFACE TURNING MACHINE
Filed July 18, 1934　　2 Sheets-Sheet 1

Inventors
Edward P. Bullard Jr,
Edward C. Bullard,

By H. T. Sperry
Attorney

March 24, 1936.  E. P. BULLARD, JR., ET AL  2,035,043

CYLINDRICAL SURFACE TURNING MACHINE

Filed July 18, 1934   2 Sheets-Sheet 2

Inventors
Edward P. Bullard Jr.
Edward C. Bullard,

By A. T. Sperry
Attorney

Patented Mar. 24, 1936

2,035,043

UNITED STATES PATENT OFFICE 2,035,043

CYLINDRICAL SURFACE TURNING MACHINE

Edward P. Bullard, Jr., and Edward C. Bullard, Fairfield, Conn., assignors to The Bullard Company, a corporation of Connecticut Application July 18, 1934, Serial No. 735,842

13 Claims. (Cl. 29—38)

While the invention is broadly applicable to the turning of widely varying types of cylindrical surfaces, both internal and external, the inventive concept is herein disclosed as embodied in a machine for the turning of automobile pistons. Obviously, the invention is in no way limited to this field although the machine is admirably suited to this application.

Broadly speaking, it is among the general objects of the invention to provide a novel, rapid, accurate and trustworthy machine for turning cylindrical surfaces to the desired dimension and configuration.

Another general object is to provide a machine characterized by simplicity of construction and operation whereby economy of manufacture and operation are achieved.

Among the more specific objects is to provide a machine particularly adapted to piston turning which, by a single operation, will complete both a roughing and finishing operation on the cylindrical surface of a work piece.

Another important object is to provide a multiple operating machine which, by manipulations of a single operation, will function to simultaneously operate on a plurality of work pieces, thus to materially increase the production of the operation.

Another object is to provide, in a multiple spindle continuous turning machine, an improved and simplified spindle driving mechanism, and further to provide a unique work spindle and tool spindle combination, and cooperative drive therefor.

A very important and generic object of the invention is to provide a machine which combines the virtues of the invention set forth in the Edward P. Bullard, Jr., Patent No. 1,574,726, and the method set forth in the Edward C. Bullard Patent No. 1,899,608. This present invention, therefore, partakes of and combines the objects, advantages and progress of the art of both of these prior patents.

Numerous other objects and advantages of the invention will be apparent from a consideration of the following specification taken in connection with the accompanying drawings in which—

Figure 1:
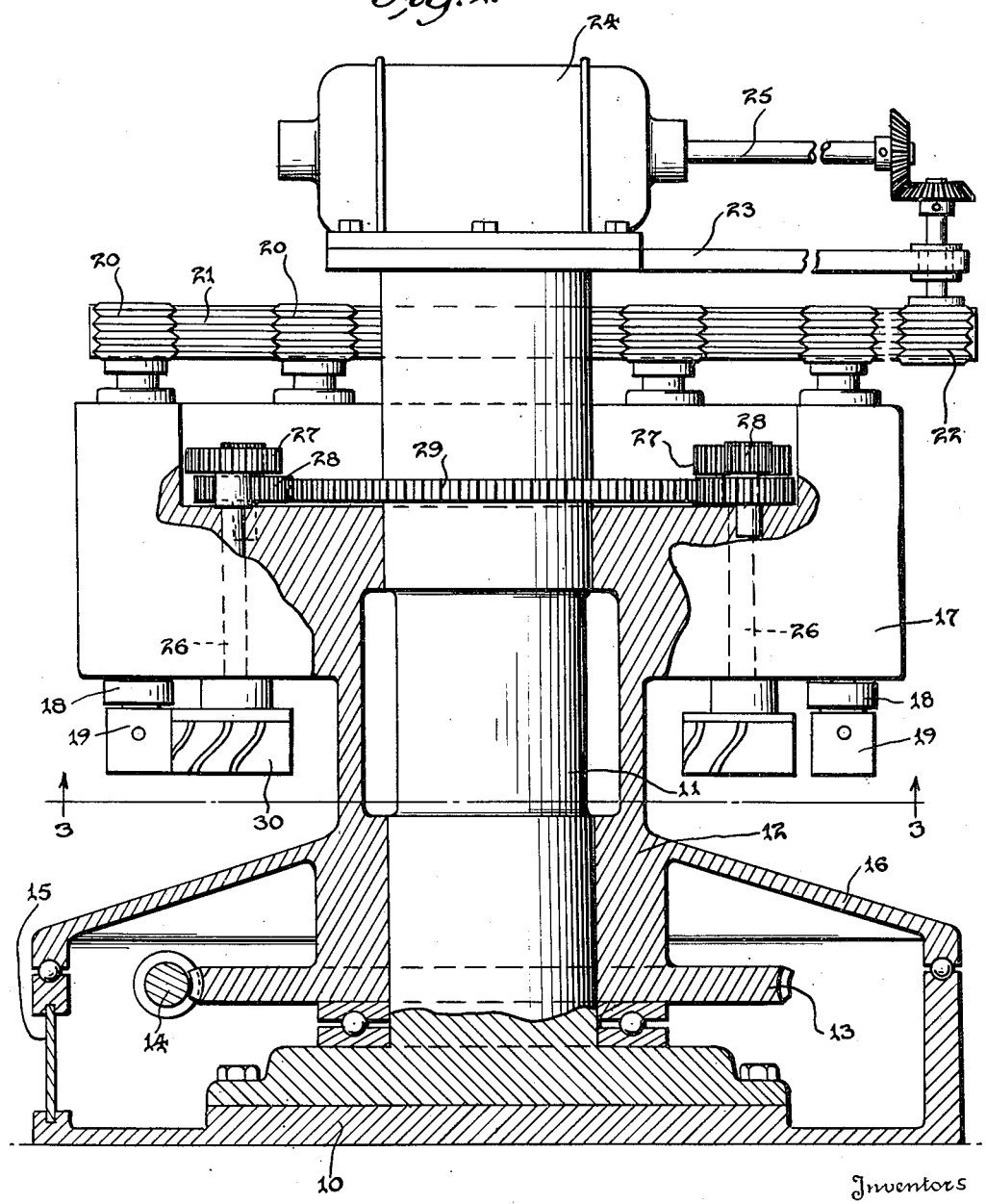
Fig. 1 is a vertical section through one embodiment of the invention.

The invention may be generally described as a multiple spindle, preferably vertical, metal turning machine characterized by a work spindle carrying table adapted to be continuously rotated to carry the spindles in an orbital path. Means, in the form of a belt, drive these spindles for rotation on their own axes. The driving belt, or belts, is so positioned that the spindle driving means move into and out of driving engagement so as to provide a rest period for the spindles during one portion of their orbital movement, thus to facilitate loading and unloading of the work.

The preferable cutting method, but not one to which the application of the inventive concept is limited, is that of the prior Patent 1,899,608 hereinbefore mentioned. To this end the work spindle carrier may also be provided with tool spindles, drive of which can properly be established by gear connection to a fixed portion of the machine whereby the orbital movement of the tool spindles will, by differential movement, rotate such spindles upon their own axes.

For a more detailed consideration of the invention reference to the drawings may be had in which the base of the machine is indicated by the numeral 10, from which extends upwardly a fixed central column 11 upon which is mounted the carrier 12, which is adapted to be rotated on the column 11 by means of its annular gear 13, which may be suitably driven as by a worm gear 14 operated from any suitable source of power so as to continuously rotate the carrier during the operation of the machine. Access to the interior of the base may be had through a sliding door 15. The base may have located therein suitable lubrication and/or cutting compound pumps, and, if desired, a motor for the gear 14.

Figure 2:
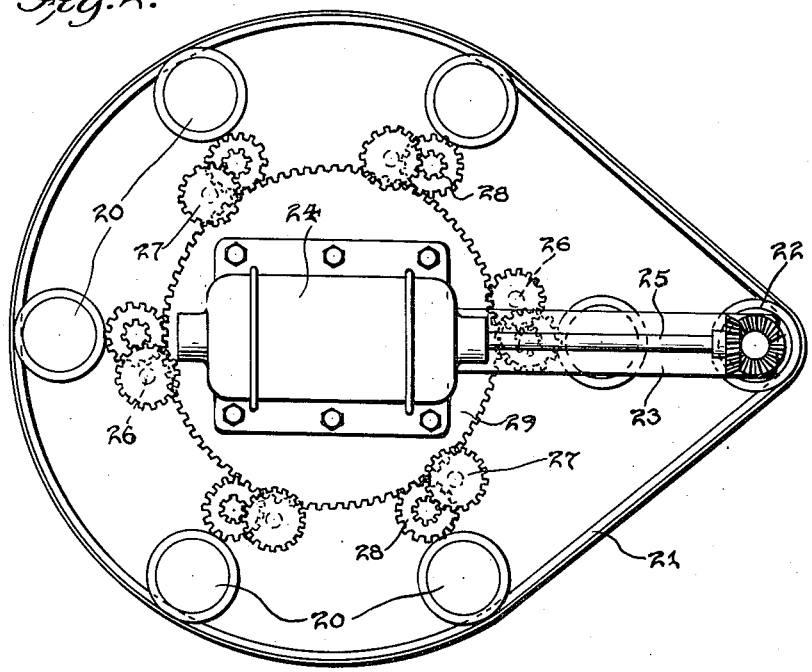
Fig. 2 is a top plan view of that form of the invention shown in Fig. 1.
Figure 3:
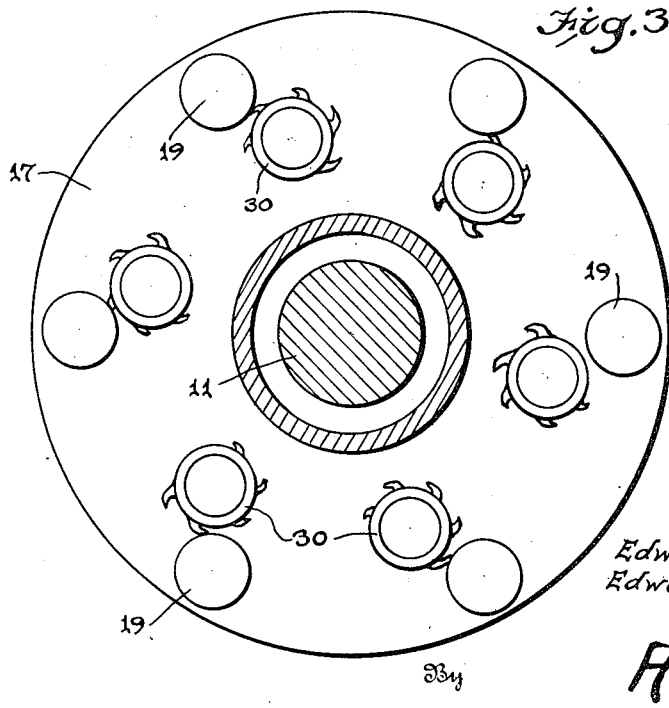
Fig. 3 is an inverted horizontal section taken on the line 3—3 of Fig. 1 and looking in the direction of the arrows.

The carrier 12 includes a lower table surface 16 which is shown as conical to assist in chip disposal and an upper turret or head portion 17. Mounted in the head is a group of equally spaced vertically disposed work spindles 18, the lower ends of which are provided with suitable chucks for holding work such as the pistons 19. The upper ends of the spindles 18 extend upwardly from the head 17 and each is provided with a pulley which, during the major portion of the orbital path of the spindle, is in contact with and driven by a belt. The pulleys, indicated by the numerals 20, are of multiple groove formation and the driving means is a plurality of V belts 21 which are driven from a driving pulley 22 fixedly supported from the central column by a motor bracket 23 which supports a spindle driving motor 24 and its shaft 25. Since the driving pulley 22 is beyond the orbital path of the pulleys 20, the belts 21 will form an outline as shown in Fig. 2, the pulleys 20 being in contact with and driven by the belts except when they reach the right hand side of the machine. At that point their orbital path departs from the belts thus permitting the spindles to come to rest so that work may be removed from or placed thereon. If desired, a brake may be provided for the spindles to insure their stoppage at that time.

Associated with each work spindle 18 is a tool spindle 26 which extends through the head 17. The upper ends of the tool spindles 26 are provided with compound gears 27 meshing with gears 28 which, in turn, are in toothed engagement with a fixed circular gear 29. This arrangement and the gear ratios are such that, as the carrier makes one complete revolution, each tool spindle 26 makes one complete revolution on its own axis.

Each tool spindle 26 carries a rotary stepped tooth cutter 30 for the characteristics of which reference may be had to the Patent #1,899,608 hereinbefore referred to. Suffice it, therefore, here to say that the cutters have a series of elongated spiral blades, at least some of which extend different radial distances from the axis. The cutters also preferably have similar blades of equal radial distance which perform the finish-operation. One area of the cutters is bladeless and the tooling is such that while the work and tool spindles are in the loading area, which is defined by that portion of the cycle where the pulleys 20 are out of contact with the belts 21, this bladeless area is next to the work spindles, thus permitting the removal or insertion of work without contact with the blades of the cutter.

In the operation of the device, as the work moves from the loading area, the work spindle pulleys engage the belts 21 and rotate the work at cutting speed and in such orbital movement the cutters are rotated so that the successive blades successively engage the work surface. The stepped blades successively reduce the surface an amount determined by the radial difference in the extension of the blades while the finishing blades perform a finishing operation.

It will, of course, be understood that the blades may have a contour determined by the contour of the desired finished surface, for instance, such blades may be found to cut the ring grooves of the pistons as well as turn the contour of the skirts. Furthermore, it will be understood that the invention is not limited to the type of cutter shown. It is obvious that the inventive concept is applicable to the use of unstepped cutter blades.

An important feature of the invention is that the work is inverted and thus a full, free clearance is left under the work so that the danger of interference to the work or tool spindle rotation by chip clogging is eliminated.

From the foregoing it will be seen that the invention provides a novel, simple, efficient and economic apparatus for accomplishing the objects set forth. Obviously the concept is amenable to numerous changes, modifications and the full use of equivalents without departing from the spirit or scope of the invention as outlined in the appended claims.

We claim:

1. In a metal working machine, a base, a continuously rotatable carrier mounted thereon, a plurality of sets of rotatable work spindles and rotatable tool spindles mounted on said carrier, friction means for driving said work spindles during a portion of their cycle of movement with the carrier and gear means for driving said tool spindles, said last mentioned means including a fixed gear carried by the base with which tool spindle gears mesh.

2. In a metal working machine, a base, a continuously rotatable carrier mounted thereon, a plurality of sets of rotatable work spindles and rotatable tool spindles mounted on said carrier, friction means for driving said work spindles during a portion of their cycle of movement with the carrier and gear means for driving said tool spindles, said first mentioned means comprising a belt running in a fixed path with which the spindles coincide during a portion of their movement with the carrier, said last mentioned means including a fixed gear carried by the base with which tool spindle gears mesh.

3. In a machine tool, a carrier, a pair of parallel spindles carried thereby, a rotary work holding chuck on one spindle, a rotary multiple bladed tool on the other spindle, and means operable with movement of the carrier to rotate said spindles on their axes to produce cutting action between the tool and work carried by the chuck.

4. In a machine tool having a continuously rotating carrier and a plurality of work holders mounted therein, the combination of a longitudinally fixed rotatable tool spindle for each work holder and means for rotating each tool spindle one complete revolution on its own axis with each revolution of the carrier.

5. In a machine tool, having a continuously rotating carrier and a plurality of work holders mounted therein, the combination of a longitudinally fixed rotatable tool spindle for each work holder and means for rotating each tool spindle one complete revolution on its own axis with each revolution of the carrier, and means for rotating the work spindles at cutting speed during a portion of their movement with the carrier.

6. In a machine tool, having a continuously rotating carrier and a plurality of work holders mounted therein, the combination of a longitudinally fixed rotatable tool spindle for each work holder and means for rotating each tool spindle one complete revolution on its own axis with each revolution of the carrier, and for discontinuing the drive of the work spindles at a portion of their movement with the carrier.

7. In a multiple spindle machine tool, the combination with a driving belt running in an elliptical path of a rotatable carrier having spindles and driving pulleys moved by the carrier in an orbital path internally tangent to a portion of the elliptical path of the belt whereby said spindles will be rotated on their own axes by said belt while in the tangential portion of their orbital path.

8. In a multiple spindle machine tool, the combination with a driving belt running in an elliptical path of a rotatable carrier having spindles and driving pulleys moved by the carrier in an orbital path internally tangent to a portion of the elliptical path of the belt whereby said spindles will be rotated on their own axes by said belt while in the tangential portion of their orbital path, and a series of tool spindles continuously rotatable on their own axes by and with the rotary movement of the carrier.

9. In a machine tool, the combination with a carrier of a work holding spindle mounted therein, a tool holding spindle parallel thereto and mounted therewith in the carrier, a tool carried by the tool spindle including a plurality of blades movable by rotation of the tool spindle in a circular path externally tangent to the surface of work carried by the work spindle.

10. In a machine tool the combination with a revolvable work spindle of a parallel revolvable tool spindle and a multi-bladed cutter carried by the tool spindle, the blades thereof being movable by rotation of the tool spindle in a circular path externally tangent to the surface of work carried by the work spindle.

11. In a machine tool, the combination with a rotatable carrier of a plurality of spindles carried thereby and movable therewith in an orbital path comprising a work zone and a loading and unloading zone, frictional means for rotating said spindles while passing through said working zone and means for permitting said spindles to come to rest while passing through said loading and unloading zone.

12. In a machine tool, the combination with a rotatable carrier of a plurality of work spindles carried thereby and movable therewith in an orbital path comprising a work zone and a loading and unloading zone, frictional means for rotating said spindles while passing through said working zone and means for permitting said spindles to come to rest while passing through said loading and unloading zone, a rotatable tool spindle for each work spindle and means for giving each tool spindle at least one complete revolution on its own axis during one complete cycle of orbital movement thereof.

13. In a machine tool, the combination with a rotatable carrier of a plurality of work spindles carried thereby and movable therewith in an orbital path comprising a work zone and a loading and unloading zone, frictional means for rotating said spindles while passing through said working zone, means for permitting said spindles to come to rest while passing through said loading and unloading zone, a rotatable tool spindle for each work spindle and means for giving each tool spindle at least one complete revolution on its own axis during one complete cycle of orbital movement thereof, and a step bladed cutter mounted on each tool spindle each blade being caused to move in a circular path externally tangent to a work surface of work carried by its work spindle.

EDWARD P. BULLARD, Jr.
EDWARD C. BULLARD.